US008644811B2

(12) United States Patent
Tsao et al.

(10) Patent No.: US 8,644,811 B2
(45) Date of Patent: Feb. 4, 2014

(54) SYSTEM, METHOD, AND APPARATUS FOR AVOIDING CALL DROP FOR A WIRELESS PHONE

(75) Inventors: Shoujung Jimmy Tsao, Fremont, CA (US); Jungfu Tsao, San Jose, CA (US); Jung-Hong Kao, Los Altos, CA (US)

(73) Assignee: Cisco Technology, Inc., San Jose, CA (US)

( * ) Notice: Subject to any disclaimer, the term of this patent is extended or adjusted under 35 U.S.C. 154(b) by 1061 days.

(21) Appl. No.: 11/734,033

(22) Filed: Apr. 11, 2007

(65) Prior Publication Data

US 2008/0254787 A1 Oct. 16, 2008

(51) Int. Cl.
*H04M 3/00* (2006.01)

(52) U.S. Cl.
USPC .................................... 455/418; 455/422.1

(58) Field of Classification Search
USPC ........................................................ 455/422.1
See application file for complete search history.

(56) References Cited

U.S. PATENT DOCUMENTS

| 4,811,380 | A | * | 3/1989 | Spear | 455/437 |
|---|---|---|---|---|---|
| 6,215,782 | B1 | * | 4/2001 | Buskens et al. | 370/350 |
| 6,246,872 | B1 | * | 6/2001 | Lee et al. | 455/414.1 |
| 6,343,216 | B1 | | 1/2002 | Kim et al. | 455/450 |
| 6,633,760 | B1 | * | 10/2003 | Ham et al. | 455/422.1 |
| 6,745,031 | B2 | | 6/2004 | Chun et al. | 455/435.1 |
| 6,754,498 | B2 | | 6/2004 | Chun et al. | 455/442 |
| 6,766,173 | B1 | | 7/2004 | Chun et al. | 455/450 |
| 2001/0038471 | A1 | * | 11/2001 | Agrawal et al. | 359/110 |
| 2002/0068572 | A1 | | 6/2002 | Chun et al. | 455/442 |
| 2002/0068586 | A1 | * | 6/2002 | Chun et al. | 455/458 |
| 2004/0203645 | A1 | * | 10/2004 | Forman et al. | 455/414.1 |
| 2005/0021868 | A1 | | 1/2005 | Sharma et al. | 709/249 |
| 2005/0048981 | A1 | * | 3/2005 | Anupam et al. | 455/445 |
| 2005/0070286 | A1 | * | 3/2005 | Awasthi et al. | 455/436 |
| 2006/0177034 | A1 | * | 8/2006 | Reding et al. | 379/211.02 |
| 2007/0054668 | A1 | * | 3/2007 | Scheinert et al. | 455/435.1 |

* cited by examiner

*Primary Examiner* — Jinsong Hu
*Assistant Examiner* — Michael Nguyen
(74) *Attorney, Agent, or Firm* — Baker Botts L.L.P.

(57) ABSTRACT

A method for facilitating a call session includes receiving a request to establish a call session between a wireless phone and a remote phone, and establishing a call session between the wireless phone and the remote phone. The call session includes a first connection with the wireless phone and a second connection with the remote phone. The method further includes monitoring the first connection to determine if there is a connection loss of the first connection, and determining that there is a connection loss of the first connection. In response to determining that there is a connection loss of the first connection, the method further includes holding the second connection with the remote phone, attempting to reestablish the first connection with the wireless phone, and resuming the call session in response to the first connection being reestablished.

24 Claims, 2 Drawing Sheets

SYSTEM, METHOD, AND APPARATUS FOR AVOIDING CALL DROP FOR A WIRELESS PHONE

TECHNICAL FIELD

This invention relates in general to facilitating a call session between a wireless phone and a remote phone, and more particularly to avoiding call drop for the call session.

BACKGROUND

Traditionally, when a user is using a wireless phone to participate in a phone call session with a remote peer phone, the radio signal associated with the wireless phone can sometimes be lost due to radio interference or movement of the user. As a result, the signaling and payload communication between the wireless phone and the remote peer phone is lost, resulting in the phone call session being dropped. In order to reestablish the call session, a user is required to redial the phone number of the other phone.

SUMMARY

In accordance with one embodiment of the present invention, there is provided a method for facilitating a call session including receiving a request to establish a call session between a wireless phone and a remote phone, and establishing a call session between the wireless phone and the remote phone. The call session includes a first connection with the wireless phone and a second connection with the remote phone. The method further includes monitoring the first connection to determine if there is a connection loss of the first connection, and determining that there is a connection loss of the first connection. In response to determining that there is a connection loss of the first connection, the method further includes holding the second connection with the remote phone, attempting to reestablish the first connection with the wireless phone, and resuming the call session in response to the first connection being reestablished.

In accordance with another embodiment of the present invention, a system for facilitating a call session includes a wireless phone, a remote phone, and a call relay station. The call relay station is adapted to receive a request to establish a call session between the wireless phone and the remote phone, and establish a call session between the wireless phone and the remote phone. The call session includes a first connection with the wireless phone and a second connection with the remote phone. The call relay station is further adapted to monitor the first connection to determine if there is a connection loss of the first connection, and determine that there is a connection loss of the first connection. In response to determining that there is a connection loss of the first connection, the call relay station is further adapted to hold the second connection with the remote phone, attempt to reestablish the first connection with the wireless phone, and resume the call session in response to the first connection being reestablished.

An advantage of certain embodiments of the present invention is that call drop due to temporary loss of a radio signal when using a wireless phone can be avoided.

Other technical advantages of the present invention will be readily apparent to one skilled in the art from the following figures, descriptions, and claims. Moreover, while specific advantages have been enumerated above, various embodiments may include all, some, or none of the enumerated advantages.

BRIEF DESCRIPTION OF THE DRAWINGS

For a more complete understanding of the present invention and its advantages, reference is now made to the following description, taken in conjunction with the accompanying drawings, in which.

DETAILED DESCRIPTION

In accordance with some embodiments of the invention, a wireless phone, such as, for example, a wireless (802.11) Internet Protocol (IP) phone or mobile phone, is assigned to a call relay station, preferably in geographic proximity to the wireless phone, to avoid call drop due to temporary loss of the radio signal associated with the wireless phone. The system finds a reliable call relay station to which to assign the wireless phone. During a call session between the wireless phone and a remote peer phone, the call relay station continuously monitors the connection to the wireless phone, holds or parks the call session if the connection to the wireless phone is dropped due to loss of the radio signal, and resumes the call session when the connection is re-established. This allows a call session to be reestablished without requiring a user to redial the phone number associated with the other phone in the call session.

Figure 1:
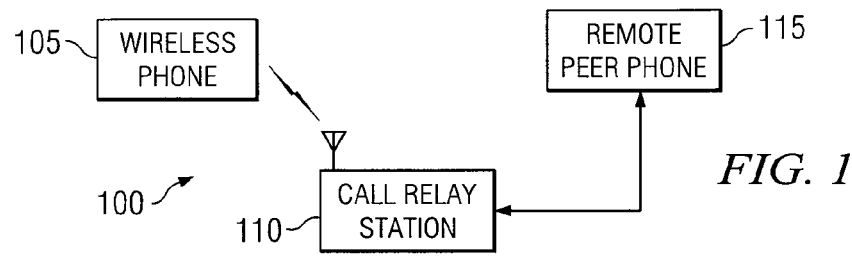
FIG. 1 is a block diagram of a system for avoiding call drop in accordance with an embodiment of the present invention.

FIG. 1 is a block diagram of a system 100 for avoiding call drop in accordance with an embodiment of the present invention. The system 100 includes a wireless phone 105 having a wireless connection to a call relay station 110. The wireless phone 105 is assigned to the call relay station 110 during call setup. In at least one embodiment, wireless phone 105 may include a wireless Internet Protocol (IP) phone or a mobile phone. In at least one embodiment of the invention, the call relay station 110 is located in geographical proximity to the wireless phone 105. In some embodiments of the invention, the call relay station 110 can be a router or gateway.

The system 100 further includes a remote peer phone 115 coupled to the call relay station 110. In accordance with various embodiments of the invention, the remote peer phone 115 is coupled to the call relay station 110 through a reliable connection such as a wireline or mostly wireline connection. Accordingly, communication between the call relay station 110 and the remote peer phone 115 is not affected by the radio signal to the wireless phone 105. In accordance with one embodiment, the connection of the remote peer phone 115 to the call relay station 110 is through a public switched telephone network (PSTN) and/or packet switched network.

In some embodiments, a request to establish a call session between the remote peer phone 115 and the wireless phone 105 is sent by the remote peer phone 115 to the call relay station 110. In at least one embodiment, the request is initiated by a user of the remote peer phone 115 dialing a telephone number associated with the wireless phone 105. In response to the request to establish the call session, the call relay station 110 establishes a first call connection to the remote peer phone 115 and a second call connection to the wireless phone 105. During the call session, the call relay station 110 relays voice or other payload data between the wireless phone 105 and the remote peer phone 115.

During the call session, the call relay station 110 continuously monitors the connection to the wireless phone 105. If the connection is lost due to the loss of the radio signal, the call relay station 110 holds or parks the call so that the connection to the remote peer phone 115 is still active. In at least one embodiment, the call relay station 110 sends an announcement message to the remote peer phone 115 to initiate playing of the announcement message by the remote peer phone 115 to the user of the remote peer phone 115 to ask the user to hold the phone until the connection between the wireless phone 105 and the call relay station 120 is automatically reestablished. In addition, the wireless phone 105 may continuously play an announcement message to a user of the wireless phone 105 to hold and not hang up while the call relay station 110 attempts to reestablish the call connection with the wireless phone 105.

After the connection is lost, the call relay station attempts to reestablish the call connection with the wireless phone 105. The call relay station further includes a timer that is started when holding or parking the connection with the remote peer phone 115 upon loss of the connection to the wireless phone 105. If after a predetermined time the connection to the wireless phone 105 has not been reestablished or the remote peer phone 115 hangs up, the call session is disconnected. When the timer expires before the connection to the wireless phone 105 can be reestablished, the call relay station 110, may play an announcement message to notify the remote peer that the call session has been disconnected.

If the connection to the wireless phone 105 is reestablished before the timer expires, the call relay station 110 stops playing the announcement message to the remote peer phone 115 and restore relaying the payload between the wireless phone 105 and the remote peer phone 115. At the same time, the wireless phone 105 also stops playing the hold announcement message to its user and restores the payload between itself and the call relay station 110. As a result, the call session is reestablished between the wireless phone 105 and the remote peer phone 115.

Although the foregoing embodiment describes a situation in the remote peer phone 115 initiates a call to the wireless phone 105, it should be understood that in other embodiments, a call can be initiated by the wireless phone 105.

In at least one embodiment, the user can selectively enable the assigning of the wireless phone 105 to the call relay station 110 to avoid call drop for an important incoming or outgoing call, and disable the assigning of the wireless phone 105 to the call relay station 110 for less important calls. In addition, in at least one embodiment, the user can choose to enable or disable the assigning of the wireless phone 105 to the call relay station 110 either before or after a call is connected. Accordingly, the user can have a choice to always assign the wireless phone 105 to the call relay station 110 for all incoming or outgoing calls, or the user can activate this feature on a call by call basis dependent upon his or her choice before or after the call is connected.

Figure 2:
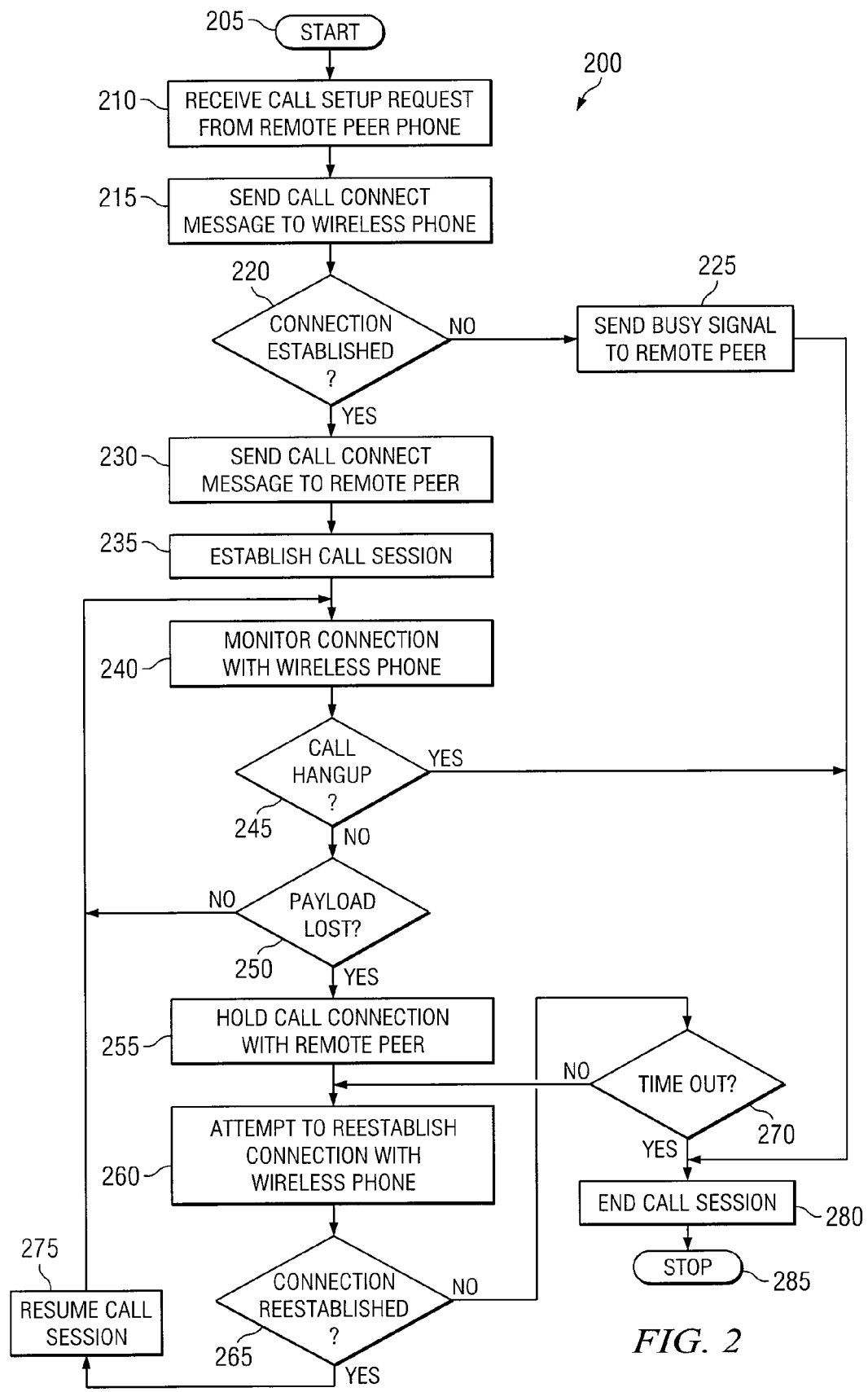
FIG. 2 is a flow diagram of a process for avoiding call drop using a call relay station in accordance with an embodiment of the present invention.

FIG. 2 is a flow diagram of a process 200 for avoiding call drop using a call relay station in accordance with an embodiment of the present invention. The process begins at a step 205. In a step 210, the call relay station 110 receives a call setup request from the remote peer phone 115. In step 215, the call relay station 110 sends a call connection message to the wireless phone 215. In step 220, a determination is made regarding whether a connection between the call relay station 110 and the wireless phone 105 has been established.

If it is determined in step 220 that the connection between the call relay station 110 and the wireless phone 105 has not been established, the call relay station 110 sends a busy signal to remote peer phone 115 in a step 225. After step 225, the call session is ended in a step 280, and the process is stopped in a step 285.

If it is determined in step 220 that the connection between the call relay station 110 and the wireless phone 105 has been established, the call relay station sends a call connect message to remote peer phone 115 in step 230. In step 235, a call session is established between the wireless phone 105 and the remote peer phone 115. During the call session, the payload of the call session is relayed between the wireless phone 105 and the remote peer phone 115 by the call relay station 110.

During the call session, the call relay station 110 monitors the connection with the wireless phone in a step 240. In a step 245, a determination is made in step 245 regarding whether there has been a hang up of the call by either the wireless phone 105 or the remote peer phone 115. If it has been determined in step 245 that the call has been hung up, the process continues to step 280 in which the call session is ended. If it is determined in step 245 that the call has not been hung up, a determination is made in a step 250 regarding whether call payload has been lost between the wireless phone 105 and the call relay station 110. Call payload loss between the wireless phone 105 and the call relay station 110 is indicative of connection loss between the wireless phone 105 and the call relay station 110 due to loss of the radio signal between the wireless phone 105 and the call relay station 110.

If it is determined in step 250 that call payload has not been lost, the process returns to step 240 in which the connection between the call relay station 110 and the wireless phone 105 is monitored.

If it is determined in step 250 that call payload has been lost, the call relay station 110 assumes that the connection between the call relay station 110 and the wireless phone 105 has been lost, and the call relay station 110 holds the connection with the remote peer phone 115 in step 255.

In step 260, the call relay station 110 attempts to reestablish the connection with the wireless phone 105. In step 265, the call relay station 110 makes a determination regarding whether the connection with the wireless phone 105 has been established. If it is determined in step 265 that the connection has not been reestablished, the call relay station 110 determines if a timer indicative of a predetermined maximum allowable time for reestablished of the connection has expired in a step 270. If it is determined in step 270 that the timer has not expired, the process returns to step 260 is which the call relay station 110 continues to attempt to reestablish the connection with the wireless phone 105. If it is determined in step 270, that the timer has expired, the process continues to step 280 in which the call session is ended.

If it is determined in step 265 that the connection has been reestablished, the call session resumes in step 275. After reestablishment of the call session, the relaying of the payload of the call session between the wireless phone 105 and the remote peer phone 115 is resumed by the call relay station 110. After resuming the call session in step 275, the process returns to step 240 in which the call relay station 110 monitors the connection between the call relay station 110 and the wireless phone 105.

In various embodiments of the invention, software embodied in a computer readable medium can comprise computer code such that when executed is operable to perform the steps described with respect to FIG. 2.

Figure 3:
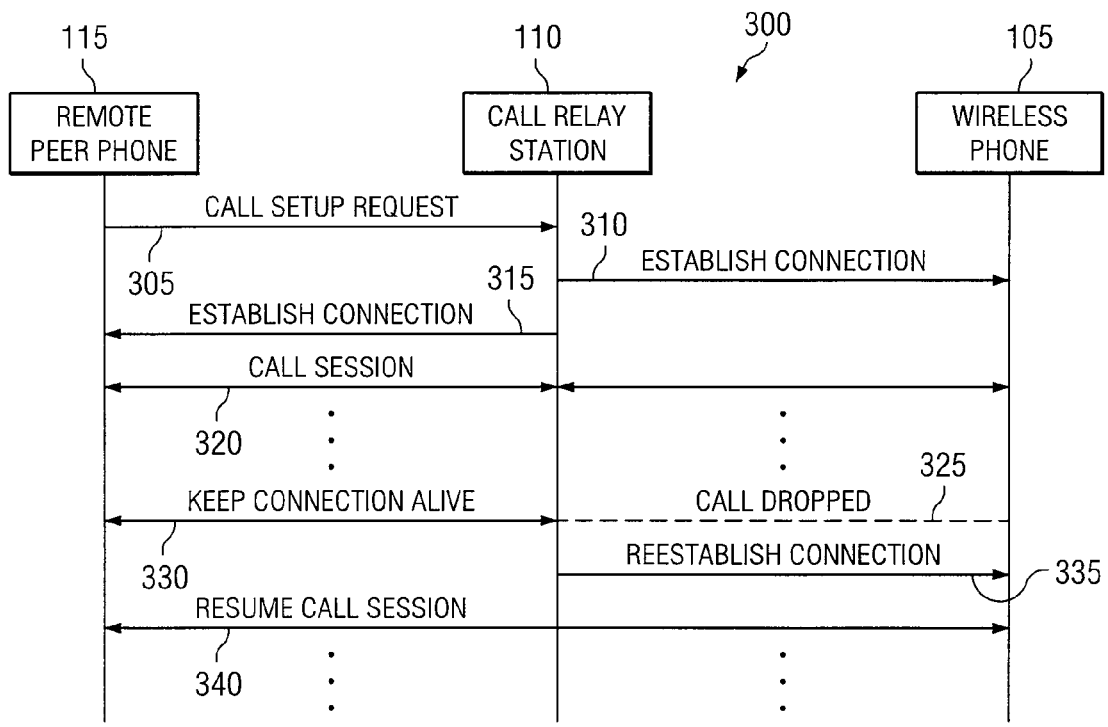
FIG. 3 is a signaling diagram of a process for avoiding call drop in accordance with an embodiment of the present invention.

FIG. 3 is a signaling diagram of a process 300 for avoiding call drop in accordance with an embodiment of the present invention. In the process 300, the remote peer phone 115 sends a call setup request 305 to the call relay station 110. The call setup request 305 includes a request to establish a call session with the wireless phone 105. After receiving the call setup request 305 from the remote peer phone 115, the call relay station establishes a connection 310 with the wireless phone 105. After establishing the connection 310 with the wireless phone 105, the call relay station establishes a connection 315 with the remote peer phone 115.

After establishing the connection 315 with the remote peer phone 115, the call relay station 110 establishes a call session 320 between the remote peer phone 115 and the wireless phone 105 in which payload between the remote peer phone 115 and the wireless phone 105 is relayed by the call relay station 110.

In the embodiment illustrated in FIG. 3, the call between the call relay station 110 and the wireless phone 105 is dropped such as from loss of the radio signal between the call relay station 110 and the wireless phone 105. The call relay station 110 then sends a message 330 to the remote peer phone 115 to keep the connection alive between the remote peer phone 115 and the call relay station 110. The call relay station 110 then reestablishes connection 335 with the wireless phone 105, and the call session is resumed in step 340.

Figure 4:
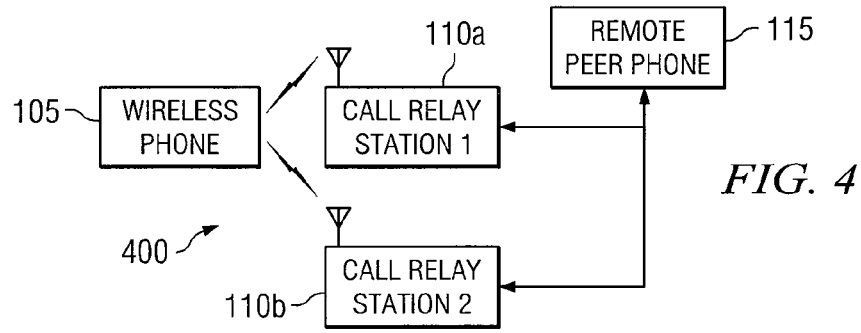
FIG. 4 is a block diagram of another system for avoiding call drop in accordance with an embodiment of the present invention.

FIG. 4 is a block diagram of another system 400 for avoiding call drop in accordance with an embodiment of the present invention. The system 400 includes a wireless phone 105, a remote peer phone 115 and a first call relay station 110a and a second call relay station 110b. In accordance with the embodiment illustrated in FIG. 4, the wireless phone 105 can be associated with either the first call relay station 110a or the second call relay station 110b. The call relay station 110a and the call relay station 110b operate in a similar manner to the call relay station 110 described with respect to FIGS. 1-3 except that the first call relay station 110a and the second call relay station 110b support roaming of the wireless phone 105. In the system 400 of FIG. 4, handoff of a call connection with wireless phone 105 between the first call relay station 110a and the second call station 110b is allowed.

For example, when a call is first established between the remote peer phone 115 and the wireless phone 105, and the wireless phone 105 is in a geographical area serviced by the first call relay station 110a, the wireless phone 105 is assigned to the first call relay station 110a. Payload information associated with the call session between the wireless phone 105 and the remote peer phone 115 is relayed by the first call relay station 110a. If the connection between the wireless phone 105 and the first call relay station 110a is lost, the first call relay station 110a attempts to reestablish the connection in the same or similar manner as the call relay station 110 described with respect to FIGS. 1-3.

If the wireless phone 105 moves out of the geographical area serviced by the first call relay station 110a, to the geographical area serviced by the second call relay station 110b, the connection with the wireless phone 105 is handed-off from the first call relay station 110a to the second call relay station 110b. Payload information associated with the call session between the wireless phone 105 and the remote peer phone 115 is then relayed by the second call relay station 110b. If the connection between the wireless phone 105 and the second call relay station 110b is lost, the second call relay station 110b attempts to reestablish the connection in the same or similar manner as the call relay station 110 described with respect to FIGS. 1-3.

An example application of the principles of the present invention may be for use in a supermarket, department store, or wholesaler using wireless (802.11) IP phones or customer service. When a store clerk walks around using a wireless (802.11) IP phone, the clerk may encounter loss of the radio signal. In accordance with certain embodiments of the invention, the call is put on hold when the signal loss is encountered, and automatically restored when the clerk moves to a place in which the radio signal is recovered. The call relay station can be located at the store close to all of the wireless (802.11) IP phone used in the store.

Although the present invention has been described with several embodiments, a myriad of changes, variations, alterations, transformations, and modifications may be suggested to one skilled in the art, and it is intended that the present invention encompass such changes, variations, alterations, transformations, and modifications as fall within the scope of the appended claims.

What is claimed is:

1. A method for facilitating a call session comprising:
   receiving a call connect message to establish the call session between a wireless phone and a remote phone;
   after the connection of the call session between the wireless phone and the remote phone, receiving, from the wireless phone, a user request requesting to selectively activate a feature for an important call session, wherein activation of the feature results in an assignment of the wireless phone to a call relay station configured to reestablish a call session to prevent a call drop during the important call session;
   in response to receiving the user request to selectively activate the feature, assigning the call session to a first call relay station, the first call relay station configured to reestablish the call session to prevent a call drop during the important call session;
   establishing, by the first call relay station, the call session between the wireless phone and the remote phone, the call session including a first wireless connection comprising a radio signal from the first call relay station to the wireless phone and a second connection from the first call relay station to the remote phone, the first call relay station being a gateway or a router;
   monitoring the first wireless connection for a connection loss of the first wireless connection;
   determining that the connection loss of the first wireless connection has occurred, and in response:
      holding, at the first call relay station, the second connection from the first call relay station to the remote phone;
      attempting to reestablish the first wireless connection with the wireless phone; and
      resuming the call session in response to the first wireless connection being reestablished by the first call relay station.

2. The method of claim 1 further comprising:
   ending the call session in response to the first wireless connection not being reestablished after a predetermined time has elapsed.

3. The method of claim 1, wherein the call connect message to establish the call session is sent by the remote phone.

4. The method of claim 1, wherein the call connect message to establish the call session is sent by the wireless phone.

5. The method of claim 1, wherein the determining that there is a connection loss of the first wireless connection comprises determining that there is a call payload loss in the first connection, 6. The method of claim 1, wherein the wireless phone comprises at least one of a wireless IP phone and a mobile phone.

7. Software for facilitating a call session, the software being embodied in a non-transitory memory comprising computer code such that when executed by a processor is operable to:
receive a call connect message to establish a call session between a wireless phone and a remote phone;
after the connection of the call session between the wireless phone and the remote phone, receive, from the wireless phone, a user request requesting to selectively activate a feature for an important call session, wherein activation of the feature results in an assignment of the wireless phone to a call relay station configured to reestablish a call session to prevent a call drop during the important call session;
in response to receiving the user request to selectively activate the feature, assign the call session to a first call relay station, the first call relay station configured to reestablish the call session to prevent a call drop during the important call session;
establish the call session between the wireless phone and the remote phone, the call session including a first wireless connection comprising a radio signal from the first call relay station to the wireless phone and a second connection from the first call relay station to the remote phone, the first call relay station being a gateway or a router;
monitor the first wireless connection for a connection loss of the first wireless connection;
determine that the connection loss of the first wireless connection has occurred, and in response:
hold, at the first call relay station, the second connection from the first call relay station to the remote phone;
attempt to reestablish the first wireless connection with the wireless phone; and
resume the call session in response to the first wireless connection being reestablished by the first call relay station.

8. The software of claim 7, wherein the computer code is further operable to:
end the call session in response to the first wireless connection not being reestablished after a predetermined time has elapsed.

9. The software of claim 7, wherein the call connect message to establish the call session is sent by the remote phone.

10. The software of claim 7, wherein the call connect message to establish the call session is sent by the wireless phone.

11. The software of claim 7, wherein the determining that the connection loss of the first wireless connection has occurred further comprises determining that there is a call payload loss in the first wireless connection.

12. The software of claim 7, wherein the wireless phone comprises at least one of a wireless IP phone and a mobile phone.

13. A system for facilitating a call session comprising:
a first call relay station, the first call relay station being a gateway or a router, the first call relay station being adapted to:
receive a call connect message to establish a call session between a wireless phone and a remote phone;
after the connection of the call session between the wireless phone and the remote phone, receive, from the wireless phone, a user request requesting to selectively activate a feature for an important call session, wherein activation of the feature results in an assignment of the wireless phone to a call relay station configured to reestablish a call session to prevent a call drop during the important call session;
in response to receiving the user request to selectively activate the feature, assign the call session to a first call relay station, the first call relay station configured to reestablish the call session to prevent a call drop during the important call session;
establish a call session between the wireless phone and the remote phone, the call session including a first wireless connection comprising a radio signal from the first call relay station to the wireless phone and a second connection from the first call relay station to the remote phone;
monitor the first wireless connection for a connection loss of the first wireless connection; and
determine that the connection loss of the first wireless connection has occurred, and in response:
hold, at the first call relay station, the second connection from the first call relay station to the remote phone;
attempt to reestablish the first wireless connection with the wireless phone; and
resume the call session in response to the first wireless connection being reestablished.

14. The system of claim 13 wherein the first call relay station is further operable to:
end the call session in response to the first wireless connection not being reestablished after a predetermined time has elapsed.

15. The system of claim 13, wherein the call connect message to establish the call session is sent by the remote phone.

16. The system of claim 13, wherein the call connect message to establish the call session is sent by the wireless phone.

17. The system of claim 13, wherein the determining that the connection loss of the first wireless connection has occurred comprises determining that there is a call payload loss in the first wireless connection.

18. The system of claim 13, wherein the wireless phone comprises at least one of a wireless IP phone and a mobile phone.

19. A first call relay station, the first call relay station being a gateway or a router, the first call relay station comprising:
means for receiving a call connect message to establish the call session between the wireless phone and a remote phone;
after the connection of the call session between the wireless phone and the remote phone, means for receiving, from the wireless phone, a user request requesting to selectively activate a feature for an important call session, wherein activation of the feature results in an assignment of the wireless phone to a call relay station configured to reestablish a call session to prevent a call drop during the important call session;
in response to receiving the user request to selectively activate the feature, means for assigning the call session to a first call relay station, the first call relay station configured to reestablish the call session to prevent a call drop during the important call session;
means for establishing the call session between the wireless phone and the remote phone, the call session including a first wireless connection comprising a radio signal from the first call relay station to the wireless phone and a second connection from the first call relay station to the remote phone;
means for monitoring the first wireless connection for a connection loss of the first wireless connection;

means for determining that the connection loss of the first connection has occurred, the first call relay station further comprising:
  means for holding the second connection from the first call relay station to the remote phone;
  means for attempting to reestablish the first wireless connection with the wireless phone; and
  means for resuming the call session if the first wireless connection is reestablished.

20. A wireless phone comprising at least one processor and memory, the memory containing computer code such that when executed by the processor is operable to:
  receive, from the call relay station, a call connect message for establishing a call session between the wireless phone and a remote peer phone;
  after the connection of the call session between the wireless phone and the remote phone, receive, from the wireless phone, a user request requesting to selectively activate a feature for an important call session, wherein activation of the feature results in an assignment of the wireless phone to a call relay station configured to reestablish a call session to prevent a call drop during the important call session;
  in response to receiving the user request to selectively activate the feature, assign the call session to a first call relay station, the first relay station configured to reestablish the call session to prevent a call drop during the important call session, the important call session including a first wireless connection comprising a radio signal from the wireless phone to the call relay station and a second connection from the remote peer phone to the call relay station, the call relay station being a gateway or a router; and
  generate, in response to a determination that there is a connection loss of the first wireless connection from the wireless phone to the call relay station, an announcement message that instructs the user of the wireless phone to hold, the announcement played while the call session is held and the first wireless connection between the wireless phone and the call relay station is automatically reestablished.

21. The method of claim 1, further comprising:
playing an announcement message to a user of the wireless phone that instructs the user to hold while the call session is being reestablished.

22. The method of claim 1, further comprising:
relaying payload information between the wireless phone and the remote phone through a second relay station.

23. The method of claim 1, wherein the wireless phone is an Internet Protocol (IP) phone.

24. The method of claim 1, further comprising playing, by the call relay station, an announcement message to the remote phone that the call session has been disconnected if a timer expires before the first wireless connection can be reestablished, the timer beginning upon the determination that the loss of the first wireless connection has occurred.

* * * * *